United States Patent
Lecciso et al.

(10) Patent No.: US 11,438,466 B2
(45) Date of Patent: Sep. 6, 2022

(54) GENERATING AN AUTOMATIC VIRTUAL PHOTO ALBUM

(71) Applicant: HCL TECHNOLOGIES ITALY S.P.A., Milan (IT)

(72) Inventors: Francesco Lecciso, Rome (IT); Luca Balestrazzi, Rome (IT); Fabiana Alessandro, Rome (IT)

(73) Assignee: HCL TECHNOLOGIES ITALY S.P.A., Milan (IT)

( * ) Notice: Subject to any disclaimer, the term of this patent is extended or adjusted under 35 U.S.C. 154(b) by 202 days.

(21) Appl. No.: 16/721,776

(22) Filed: Dec. 19, 2019

(65) Prior Publication Data

US 2021/0195037 A1    Jun. 24, 2021

(51) Int. Cl.
H04N 1/00    (2006.01)
H04N 5/247   (2006.01)
H04N 5/232   (2006.01)
G06V 40/16   (2022.01)

(52) U.S. Cl.
CPC ....... *H04N 1/00196* (2013.01); *G06V 40/161* (2022.01); *G06V 40/175* (2022.01); *H04N 1/00159* (2013.01); *H04N 1/00183* (2013.01); *H04N 5/232933* (2018.08); *H04N 5/247* (2013.01)

(58) Field of Classification Search
CPC ........... G06K 9/00308; G06K 9/00228; H04N 5/247; H04N 1/00159; H04N 1/00183; H04N 1/00196; H04N 5/232933; H04N 5/23219
See application file for complete search history.

(56) References Cited

U.S. PATENT DOCUMENTS

| | | | | |
|---|---|---|---|---|
| 8,024,317 B2* | 9/2011 | Nair | ................ | G06Q 30/0275 705/37 |
| 8,032,508 B2* | 10/2011 | Martinez | ............ | G06F 16/9535 707/706 |
| 8,060,492 B2* | 11/2011 | Nair | .................... | G06F 16/958 707/709 |
| 8,161,039 B2* | 4/2012 | Nielen | .................. | G11B 27/11 707/723 |
| 8,599,275 B2* | 12/2013 | Kashiwa | ........... | H04N 1/00196 348/211.3 |
| 8,676,937 B2* | 3/2014 | Rapaport | ............... | H04L 51/52 709/219 |
| 8,750,574 B2* | 6/2014 | Ganong | ................ | G06V 10/32 382/115 |

(Continued)

FOREIGN PATENT DOCUMENTS

| | | |
|---|---|---|
| CN | 101646017 A | 2/2010 |
| CN | 103685940 A | 3/2014 |

*Primary Examiner* — Philip P. Dang
(74) *Attorney, Agent, or Firm* — Kendal Sheets

(57) ABSTRACT

The present disclosure relates to system(s) and method(s) for generating an automatic virtual photo album. The system receives a signal. The signal is configured to enable a rear camera and a front camera of a device to click a set of images. The set of images comprise a subset of front images and a subset of rear images. The subset of front images is further analysed. Based on the analysis, the system extracts a photographer mood. The system further links the photographer mood with the subset of rear images. Upon the linking, the system generates an automatic photo album.

10 Claims, 3 Drawing Sheets

(56) References Cited

U.S. PATENT DOCUMENTS

| | | | | |
|---|---|---|---|---|
| 8,755,837 | B2* | 6/2014 | Rhoads | H04N 1/2133 |
| | | | | 382/312 |
| 8,873,813 | B2* | 10/2014 | Tadayon | G06K 9/62 |
| | | | | 382/118 |
| 9,055,216 | B1* | 6/2015 | Taylor | H04N 5/23293 |
| 9,152,301 | B2* | 10/2015 | Akifusa | G06F 1/1692 |
| 9,349,414 | B1* | 5/2016 | Furment | H04N 9/8227 |
| 9,407,834 | B2* | 8/2016 | Kim | H04N 5/272 |
| 9,563,643 | B2* | 2/2017 | Panneer | G06V 40/172 |
| 9,805,123 | B2* | 10/2017 | Nair | G06F 16/9535 |
| 9,910,865 | B2* | 3/2018 | Mikolajczyk | G06F 16/58 |
| 9,916,538 | B2* | 3/2018 | Zadeh | A61B 5/7221 |
| 10,169,646 | B2* | 1/2019 | Ganong | G06K 9/6219 |
| 10,296,539 | B2* | 5/2019 | Tsutaoka | G06V 10/763 |
| 10,489,688 | B2* | 11/2019 | Shen | G06V 10/44 |
| 10,560,601 | B2* | 2/2020 | Obayashi | H04N 1/00161 |
| 10,678,484 | B2* | 6/2020 | Yano | G06F 3/1287 |
| 10,740,641 | B2* | 8/2020 | Iguchi | G06V 10/751 |
| 10,796,405 | B2* | 10/2020 | Kunieda | G06T 3/40 |
| 10,805,647 | B2* | 10/2020 | Zhang | H04N 21/23418 |
| 10,878,606 | B2* | 12/2020 | Ishida | G06F 3/147 |
| 10,943,376 | B2* | 3/2021 | Kunieda | G06V 10/75 |
| 11,044,334 | B2* | 6/2021 | Yano | H04L 67/34 |
| 11,074,495 | B2* | 7/2021 | Zadeh | G06V 10/25 |
| 11,074,734 | B2* | 7/2021 | Kunieda | G06T 11/60 |
| 2007/0247540 | A1 | 10/2007 | Iguchi et al. | |
| 2010/0125569 | A1* | 5/2010 | Nair | G06Q 30/02 |
| | | | | 707/E17.055 |
| 2012/0075267 | A1* | 3/2012 | Akifusa | A63F 13/655 |
| | | | | 345/204 |
| 2012/0098998 | A1* | 4/2012 | Lee | G11B 27/34 |
| | | | | 348/231.4 |
| 2012/0120186 | A1 | 5/2012 | Deng et al. | |
| 2015/0036020 | A1* | 2/2015 | Shehane | G06F 3/14 |
| | | | | 348/231.2 |
| 2015/0242679 | A1 | 8/2015 | Naveh et al. | |
| 2016/0127641 | A1 | 5/2016 | Gove | |
| 2017/0026528 | A1* | 1/2017 | Kim | H04N 1/00442 |
| 2017/0171462 | A1* | 6/2017 | Deng | G06V 40/174 |
| 2017/0214857 | A1* | 7/2017 | Park | H04N 5/2257 |
| 2018/0217743 | A1* | 8/2018 | Ishida | G06F 3/1201 |
| 2018/0315131 | A1* | 11/2018 | Peh | G06Q 40/123 |
| 2020/0007759 | A1* | 1/2020 | Takahashi | G06V 20/35 |
| 2021/0128868 | A1* | 5/2021 | Matsumoto | H04M 1/72403 |
| 2021/0176197 | A1* | 6/2021 | Al Majid | H04L 51/52 |

* cited by examiner

# GENERATING AN AUTOMATIC VIRTUAL PHOTO ALBUM

The present application does not claim priority from any patent application.

TECHNICAL FIELD

The present disclosure in general relates to the field of a photo album management. More particularly, the present invention relates to a system and method for generating an automatic virtual photo album.

BACKGROUND

Mobiles phones are most widespread devices in the world. The presence of digital camera has revolutionised pictures management. Typically, each Mobile phone has two independent cameras such as a front camera and a rear camera. The two independent cameras allow a user to take pictures, record videos and the like. Further, there are some technologies available that not only use the two independent cameras for video calls or self-portrait, but also to take pictures on front and rear side cameras simultaneously. However, the pictures clicked by the two independent cameras are saved separately. Further, the user has to go through all the pictures and then decide which picture can be uploaded to a social platform. In this case, the user has to spend lot of time.

SUMMARY

Before the present systems and methods for generating an automatic virtual photo album, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for generating the virtual photo album. This summary is not intended to identify essential features of the claimed subject matter nor is it intended for use in determining or limiting the scope of the claimed subject matter.

In one implementation, a method for generating an automatic album based on a photographer mood is illustrated. In one embodiment, the method may comprise receiving a signal based on user inputs. The signal may be configured to enable a rear camera and a front camera of a device to click a set of images. The set of images may comprise a subset of front images and a subset of rear images. The method may further comprise extracting a photographer mood based on an analysis of the subset of front images. The photographer mood may be one of a happy mood, a sad mod, a frustrated mood, an angry mood or a scared mood. Further, the method may comprise generating an automatic album based on linking the photographer mood with the subset of rear images.

In another implementation, a system for generating an automatic album based on a photographer mood is illustrated. The system comprises a memory and a processor coupled to the memory, further the processor is configured to execute instructions stored in the memory. In one embodiment, the processor may execute instructions stored in the memory for receiving a signal based on user inputs. The signal may be configured to enable a rear camera and a front camera of a device to click a set of images. The set of images may comprise a subset of front images and a subset of rear images. The processor may further execute instructions for extracting a photographer mood based on an analysis of the subset of front images. The photographer mood may be one of a happy mood, a sad mod, a frustrated mood, an angry mood or a scared mood. Further, the processor may execute instructions for generating an automatic album based on linking the photographer mood with the subset of rear images.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "including", "comprising", "consisting", "containing", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for generating an automatic virtual photo album are now described. The disclosed embodiments of the system and method for generating the automatic virtual photo album are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for generating an automatic virtual album is not intended to be limited to the embodiments illustrated, but is to be accorded the widest scope consistent with the principles and features described herein.

Figure 1:
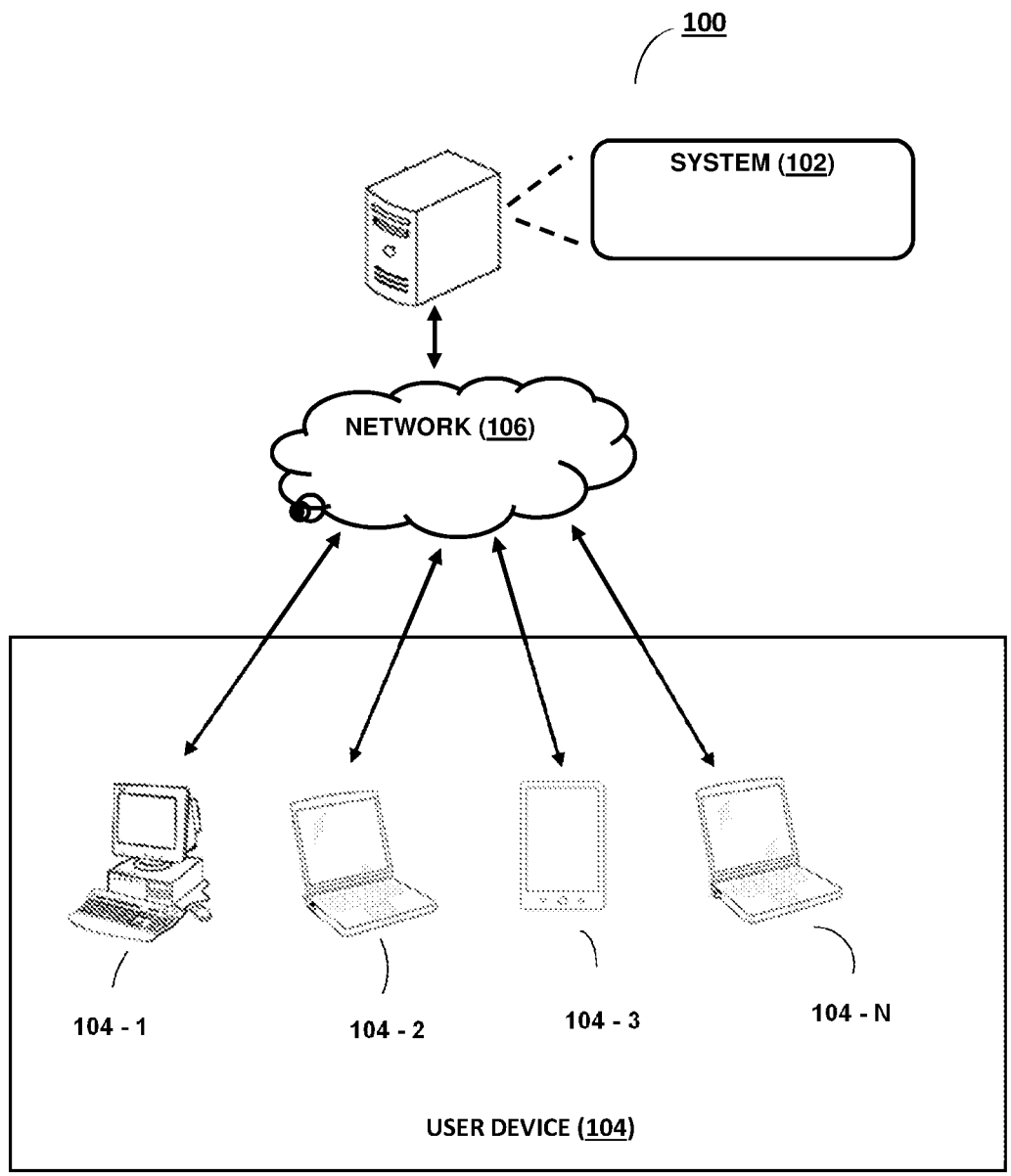
FIG. 1 illustrates a network implementation of a system for generating an automatic virtual photo album, in accordance with an embodiment of the present subject matter.

Referring now to FIG. 1, a network implementation 100 of a system 102 for generating an automatic virtual photo album is disclosed. Although the present subject matter is explained considering that the solution is mainly implemented directly on a mobile phone where a front camera 228 and rear camera 230 reside, it may be understood that once photos are taken, a logic may also be implemented in a variety of computing systems, such as a Server, a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may receive a signal based on user inputs. The signal may be configured to enable a rear camera 230 and a front camera 228 of a device to click a set of images. The set of images may comprise a subset of front images 224A and a subset of rear images 224B. The rear camera 230 may be configured to take the subset of rear images 224B, and the front camera 228 may be configured to take the subset of front images. In one aspect, the front camera 228 may capture an image of a photographer, and the rear camera 230 may capture an image of other object.

Once the set of images are captured, the system 102 may analyse the subset of front images 224A. In one aspect, the image of the photographer may be analysed in order to extract facial expressions of the photographer. The facial expressions of the photographer may be extracted using a face expression analysis technique. Based on the analysis, a photographer mood may be extracted. The photographer mood may be one of a happy mood, a sad mood, an angry mood, a scared mood and the like.

Upon extraction of the photographer mood, the system 102 may link the photographer mood with each rear image from the subset of rear images 224B. Based on the linking, the system 102 may generate the automatic virtual photo album.

Figure 2:
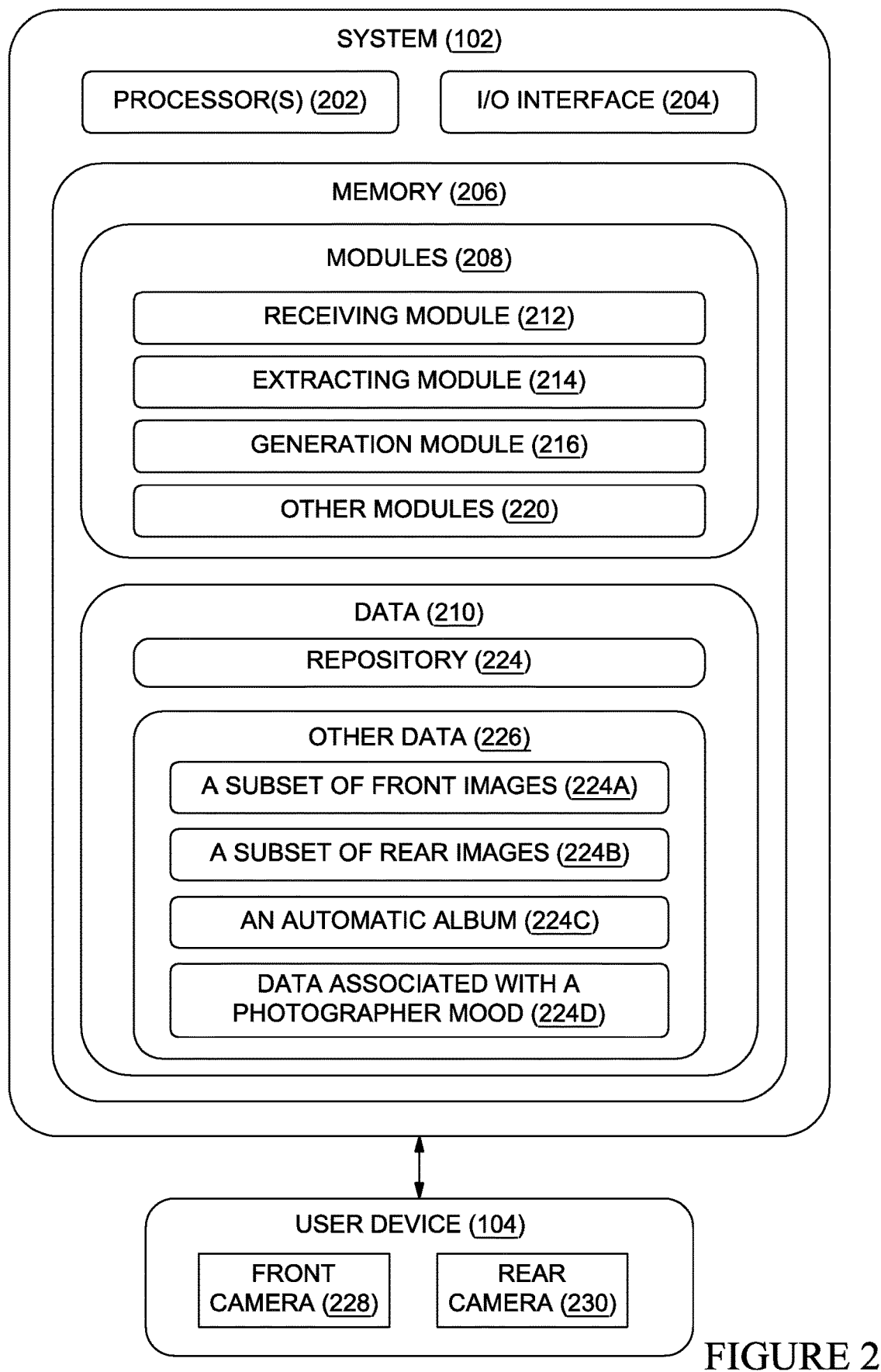
FIG. 2 illustrates the system for generating the automatic virtual photo album, in accordance with an embodiment of the present subject matter.

Referring now to FIG. 2, the system 102 for generating an automatic virtual photo album is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include data receiving module 212, an extracting module 214, a generation module 216, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 224, and other data 226. In one embodiment, the other data 226 may include data generated as a result of the execution of one or more modules in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the receiving module 212 may receive a signal based on user inputs. The signal may be configured to enable a front camera 228 and a rear camera 230 of a device to take a set of images. The device may be one of a mobile phone, a camera, a laptop, a desktop and the like. The front camera 228 and the rear camera 230 of the device may take the images simultaneously. The set of images may comprise a subset of front images 224A and a subset of rear images 224B. In one example, the set of images may be videos, pictures, photos and the like.

In one aspect, the subset of front images may be clicked by the front camera 228, and the subset of rear images 224B may be clicked by the rear camera 230. The front camera 228 may take a picture of a photographer, and the rear camera 230 may take a picture of an object.

Once the set of images are taken, the extracting module 214 may analyse the subset of front images 224A. In one aspect, a facial expression of the photographer may be extracted based on the analysis of the subset expression of front images. The subset of front images 224A may be analysed using a facial expression recognition technique.

In one aspect, the extracting module 214 may compare the facial expression of the photographer with historical facial expressions of the photographer. Based on the comparison, the photographer mood may be extracted. The historical facial expressions may be stored in the repository 224.

Further, the facial expression may be used to extract a photographer mood. The photographer mood may be one of a happy mood, a sad mood, a scared mood, and the like. The photographer mood may be further stored in data associated with the photographer mood 224D of the repository 224.

In one embodiment, the facial expression recognition technique may be used to analyse the subset of rear images 224B. Based on the analysis, facial expressions of a person, whose image is clicked by the rear camera 230, may be extracted.

Upon extraction, the generation module 216 may link the photographer mood with each rear image from the subset of rear images 224B. The linking of the rear images and the photographer mood may be referred as merging. In one aspect, a software application may be used. The application may be configured to analyse the face expression, and trace the mood of the subject. The application may be configured to recognize the mood of the photographer using a deep learning technique such as Convolutional Neural Networks. Based on the linking, the generation module 216 may generate an automatic virtual photo album. The automatic virtual photo album may be referred as a photo gallery. Further, the subset of rear images along with the subset of front images may be stored in the photo gallery based on the photographer mood. In other words, the photographer mood may be one of the filter for storing the images in the photo gallery. In one embodiment, once the set of images are clicked, the rear images and the front images may be automatically saved in a folder of the photo gallery based on the mood of the photographer.

In one example, the images clicked may be saved in one folder, referred as an angry mood, of the photo gallery, when the photographer is in the angry mood. In another example, the images clicked may be saved in one folder, referred as a happy mood, of the photo gallery, when the photographer is in the happy mood.

In one aspect, one or more rear images, from the subset of rear images 224B, may be recommended for uploading on a social media platform. The one or more rear images may be recommended to a user based on an analysis of the photographer mood. In one example, the one or more rear images may be recommended based on name, face on social App, phone number and the like. One or more filters such as the photographer mood, a subject and the like may be used to recommend the rear image.

In one embodiment, the photographer mood may be further used to generate a photographer profile. The photographer profile may comprise photographer personal information, the photographer mood, the rear images clicked by the photographer and the like. The photographer profile may comprise ratings, reviews received from users whose photos are clicked by the photographer. Further, the photographer may be recommended to other users based on the photographer profile. In one embodiment, the photographer profile may be associated to past and future photos. The photographer profile may be linked to a phone address book, an email account and the like.

In one example, construe a photographer who clicks all pictures in angry mood. The profile of the photographer may indicate that the photographer is angry. The profile may also indicate that the pictures taken by the photographer in angry mood are blur and not good. Based on the analysis, the photographer may not be recommended to other users.

Exemplary embodiments discussed above may provide certain advantages. Though not required to practice aspects of the disclosure, these advantages may include those provided by the following features.

Some embodiments of the system and the method is configured to combine a rear camera image with a front camera image.

Some embodiments of the system and the method is configured to click the rear camera image and the front camera image simultaneously using a device.

Some embodiments of the system and method is configured to generate a photo/video gallery, wherein the photo/video gallery saves rear camera images including additional media information, the mood of the photographer, and hence a meta field is added to the file.

Some embodiments of the system and method is configured to generate a photo gallery, wherein the photo gallery saves rear camera images and front camera images based on mood of the photographer.

Figure 3:
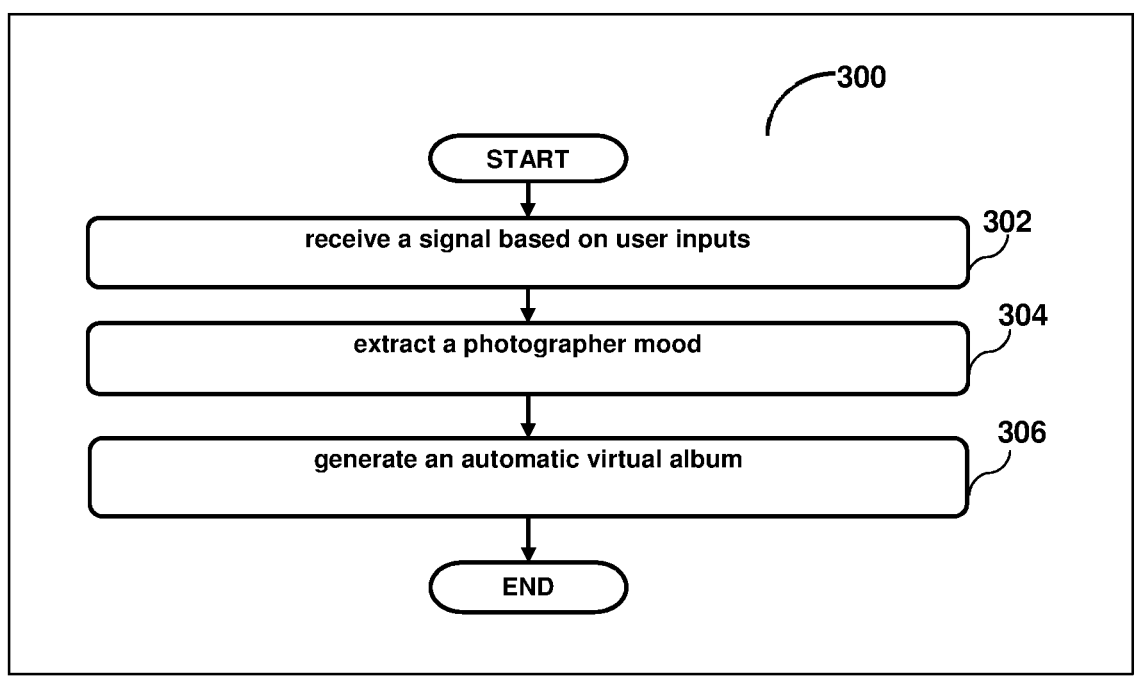
FIG. 3 illustrates a method for generating an automatic virtual photo album, in accordance with an embodiment of the present subject matter.

Referring now to FIG. 3, a method 300 for generating an automatic virtual album, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, a signal based on user inputs may be received. In one implementation, the receiving module 212 may receive the signal. The signal may be configured to enable a rear camera 230 and a front camera 228 of a device to click a set of images. The set of images may comprise a subset of front images 224A and a subset of rear images 224B.

At block 304, a photographer mood may be extracted. In one implementation, the extracting module 214 may extract the photographer mood based on an analysis of the subset of front images 224A. The photographer mood may be one of a happy mood, a sad mood, a frustrated mood, an angry mood, a scared mood, and the like.

At block 306, an automatic album 224C may be generated. In one implementation, the generating module 216 may generate the automatic virtual album based on linking the photographer mood with the subset of rear images 224B.

Although implementations for systems and methods for generating an automatic virtual album have been described, it is to be understood that the appended claims are not necessarily limited to the specific features or methods described. Rather, the specific features and methods are disclosed as examples of implementations for generating the automatic virtual album.

The invention claimed is:

1. A method to generate an automatic album based on a photographer mood, the method comprising:

enabling, by a processor, a rear camera and a front camera of a device to simultaneously capture a set of images, wherein the set of images comprise a subset of images of a photographer captured by the front camera and a subset of images of another object captured by the rear camera based upon an input from the photographer;

extracting, by the processor, the photographer mood based on an analysis of the subset of images of the photographer captured by the front camera using convolutional neural networks, wherein the photographer mood is one of a happy mood, a sad mood, a frustrated mood, an angry mood or a scared mood, and wherein extracting the photographer mood comprises training the convolutional neural networks to generate an output that is indicative of the mood;

generating, by the processor, a photographer profile using photographer information, the extracted photographer mood, the subset of images of the other object captured by the rear camera, and ratings and reviews received from users for historical photos that are clicked by the photographer; and generating, by the processor, an automatic album with metadata associated with the photographer mood, based on linking the photographer mood with the subset of images of the other object captured by the rear camera.

2. The method as claimed in claim 1, further comprises recommending one or more images of the other object captured by the rear camera, from the subset of images of the other object captured by the rear camera, to be uploaded on a social media platform, wherein the one or more images of the other object captured by the rear camera are recommended to a user based on an analysis of the photographer mood.

3. The method as claimed in claim 1, further comprises recognizing a face of the photographer based on an analysis of the subset of images of the photographer captured by the front camera, wherein the face of the photographer is analysed using a facial expression recognition technique.

4. A system to generate an automatic album based on a photographer mood, the system comprising:

a memory;

a processor coupled to the memory, wherein the processor is configured to execute instructions stored in the memory to:

enable a rear camera and a front camera of a device to simultaneously capture a set of images, wherein the set of images comprise a subset of images of a photographer captured by the front camera and a subset of images of another object captured by the rear camera based upon an input from the photographer;

extract the photographer mood based on an analysis of the subset of images of the photographer captured by the front camera using convolutional neural networks, wherein the photographer mood is one of a happy mood, a sad mood, a frustrated mood, an angry mood or a scared mood, and wherein extracting the photographer mood comprises training the convolutional neural networks to generate an output that is indicative of the mood;

generate a photographer profile using photographer information, the extracted photographer mood, the subset of images of the other object captured by the rear camera, and ratings and reviews received from users for historical photos that are clicked by the photographer; and generate an automatic album with metadata associated with the photographer mood, based on linking the photographer mood with the subset of images of the other object captured by the rear camera.

5. The system as claimed in claim 4, further configured to recommend one or more images of the other object captured by the rear camera, from the subset of images of the other object captured by the rear camera, to be uploaded on a social media platform, wherein the one or more images of the other object captured by the rear camera are recommended to a user based on an analysis of the photographer mood.

6. The system as claimed in claim 4, further configured to recognize a face of the photographer based on an analysis of the subset of images of the photographer captured by the front camera, wherein the face of the photographer is analysed using a facial expression recognition technique.

7. The method as claimed in claim 1, further comprises recommending one or more images of the other object captured by the rear camera from the subset of images of the other object captured by the rear camera to other users, based on the photographer profile.

8. The method as claimed in claim 1, wherein extracting the photographer mood comprises comparing facial expression of the photographer with historical facial expressions of the photographer using the convolutional neural networks.

9. The system as claimed in claim 4, wherein the processor is further configured to recommend one or more images of the other object captured by the rear camera from the subset of images of the other object captured by the rear camera to other users, based on the photographer profile.

10. The system as claimed in claim 4, wherein to extract the photographer mood, the processor is further configured to compare facial expression of the photographer with historical facial expressions of the photographer using the convolutional neural networks.

* * * * *